(12) United States Patent
Watanabe et al.

(10) Patent No.: US 9,612,665 B2
(45) Date of Patent: Apr. 4, 2017

(54) INFORMATION PROCESSING APPARATUS AND METHOD OF CONTROLLING THE SAME

(71) Applicant: CANON KABUSHIKI KAISHA, Tokyo (JP)

(72) Inventors: Kazuhiro Watanabe, Tokyo (JP); Wataru Kaku, Yokohama (JP); Takeshi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/719,060

(22) Filed: May 21, 2015

(65) Prior Publication Data

US 2015/0338924 A1 Nov. 26, 2015

(30) Foreign Application Priority Data

May 26, 2014 (JP) .................................. 2014-108073

(51) Int. Cl.
*G09G 5/00* (2006.01)
*G06F 3/01* (2006.01)
*G02B 27/01* (2006.01)
*G06F 3/03* (2006.01)
*G06T 3/40* (2006.01)
*H04N 5/232* (2006.01)
*G06T 11/00* (2006.01)

(52) U.S. Cl.
CPC ............. *G06F 3/017* (2013.01); *G02B 27/01* (2013.01); *G02B 27/017* (2013.01); *G02B 27/0172* (2013.01); *G06F 3/0304* (2013.01); *G06T 3/40* (2013.01); *G06T 11/00* (2013.01); *H04N 5/232* (2013.01); *G02B 2027/0178* (2013.01); *G02B 2027/0187* (2013.01)

(58) Field of Classification Search
CPC ...... G06F 1/1626; G06F 1/163; G06F 1/3231; G06F 2203/04101; G06F 3/017; G06F 3/0488; G06F 3/04883; G06F 3/0304; G06F 3/011; G06F 3/0482; G06F 3/04842; G06F 3/005; G06F 3/016; G06F 3/0425; G06F 3/04845; G06F 3/0481; G06F 3/0416; G06F 3/042; G06F 1/1694
USPC .................................. 345/173–175, 156, 169
See application file for complete search history.

(56) References Cited

U.S. PATENT DOCUMENTS

2013/0016070 A1 1/2013 Starner
2013/0055143 A1* 2/2013 Martin .................. G06F 3/0425
715/779

(Continued)

FOREIGN PATENT DOCUMENTS

JP 2009210694 A 9/2009
JP 2012098987 A 5/2012
JP 2012146236 A 8/2012

*Primary Examiner* — Duc Dinh
(74) *Attorney, Agent, or Firm* — Canon U.S.A., Inc. IP Division

(57) ABSTRACT

A distance measuring unit measures a distance from a picked-up image by an image pickup unit to a tip portion of a finger. When the measured distance is less than a reference distance, a CPU displays an identification mark at a position corresponding to the finger on a display image, and takes in a locus of the finger as a handwritten character/figure. When the measured distance is the reference distance or more, the CPU hides the identification mark, and does not take in the locus of the finger as the handwritten character/figure.

11 Claims, 10 Drawing Sheets

(56) References Cited

U.S. PATENT DOCUMENTS

2013/0162538 A1\* 6/2013 Ichieda .................. G06F 3/033
                                                                                          345/163
2014/0043232 A1\* 2/2014 Kurokawa .............. G06F 3/005
                                                                                           345/156

\* cited by examiner

INFORMATION PROCESSING APPARATUS AND METHOD OF CONTROLLING THE SAME

BACKGROUND OF THE INVENTION

Field of the Invention

The present invention relates to an information processing apparatus that performs specific processing with a motion (gesture) of a finger of a user, and a method of controlling the information processing apparatus.

Description of the Related Art

As an input operation method of a television receiver, a recorded video reproducing apparatus, a remote conference system, and the like, a gesture input operation method using a motion of a finger of a user or a body expression has appeared. The gesture input operation method is to pick up an image of the motion (gesture) of the finger of the user, identifies a pattern of a locus of the motion of a specific portion (for example, a tip portion of the finger) from picked-up picture data, and inputs a value or an operation command corresponding to the identified pattern.

Japanese Patent Application Laid-Open No. 2012-098987 describes a gesture identification device that activates a gesture input when the finger is positioned outside a start/end point input determination region on image data obtained by picking up an image of the user. Further, Japanese Patent Application Laid-Open No. 2012-098987 describes that the start/end point input determination region is enlarged larger than an initial size when the position of the finger is within the start/end point input determination region, and the size of the start/end point input determination region is returned to the initial size when the finger is positioned outside the start/end point input determination region.

Japanese Patent Application Laid-Open No. 2012-146236 describes a gesture input device that activates operation control with a gesture only when the finger of the user exists within a gesture identification region set in advance in a real space.

US Patent Application Publication No. 2013/0016070 describes an input operation method to a head mounted display (HMD)-type information processing terminal by projecting a graphical user interface (GUI) on a real object such as an arm or a hand, and detecting a touch to the projected GUI.

In the conventional technologies, a problem still exists, in which it is difficult to distinguish a gesture performed by the user with an intension of an input operation and a motion of a finger without a purpose of the input operation.

The technology disclosed in Japanese Patent Application Laid-Open No. 2012-146236 sets a gesture identification region in advance, determines the motion of the finger in the region as a "gesture performed with an intension of an input operation", and determines the motion of the finger outside the region as an "another operation". In this technology, all of motions of the finger in the gesture identification region are identified as gestures. For example, this technology cannot distinguish a movement of the finger of running a pencil of when the user intends to input a character (a movement of the finger that inputs a line that configures the character), and a movement of the finger from stopping a pencil (so-called "stopping") to starting a pencil (so-called "typing"). Further, this technology cannot distinguish a so-called "pen on" state in which an input of drawing is being performed, and a "pen off" state in which the input is not performed, of when some sort of drawing is performed.

SUMMARY OF THE INVENTION

An objective of the present invention is to provide an information processing apparatus that can appropriately identify a gesture performed by a user with an intension of an input operation, and a motion of a finger without a purpose of an input operation.

An information processing apparatus includes:

a detection unit configured to detect a base point of an operation body that performs a gesture operation;

a distance measuring unit configured to measure a distance to the base point;

a processing unit configured to perform processing according to a motion of the base point when the distance to the base point satisfies a distance condition of whether the distance is equal to or less than a reference distance or the distance is equal to or more than the reference distance; and a display control unit configured to display a picked-up image on a display unit, the picked-up image being an image of the operation body picked up by an image pickup unit, and to perform control to display an identification mark at a position on the display unit corresponding to a position of the base point in the picked-up image displayed on the display unit when the distance to the base point satisfies the distance condition.

Further features of the present invention will become apparent from the following description of exemplary embodiments (with reference to the attached drawings).

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

(Hereinafter, favorable embodiments for implementing the present invention will be described in detail with reference to the appended drawings. Note that embodiments to be described below are mere examples for realizing the present invention, and should be appropriately modified or changed according to a configuration of a device to which the present invention is applied and various conditions, and the present invention is not limited to the embodiments below.)

Hereinafter, embodiments of the present invention will be described in detail with reference to the drawings.

First Embodiment

Figure 1:
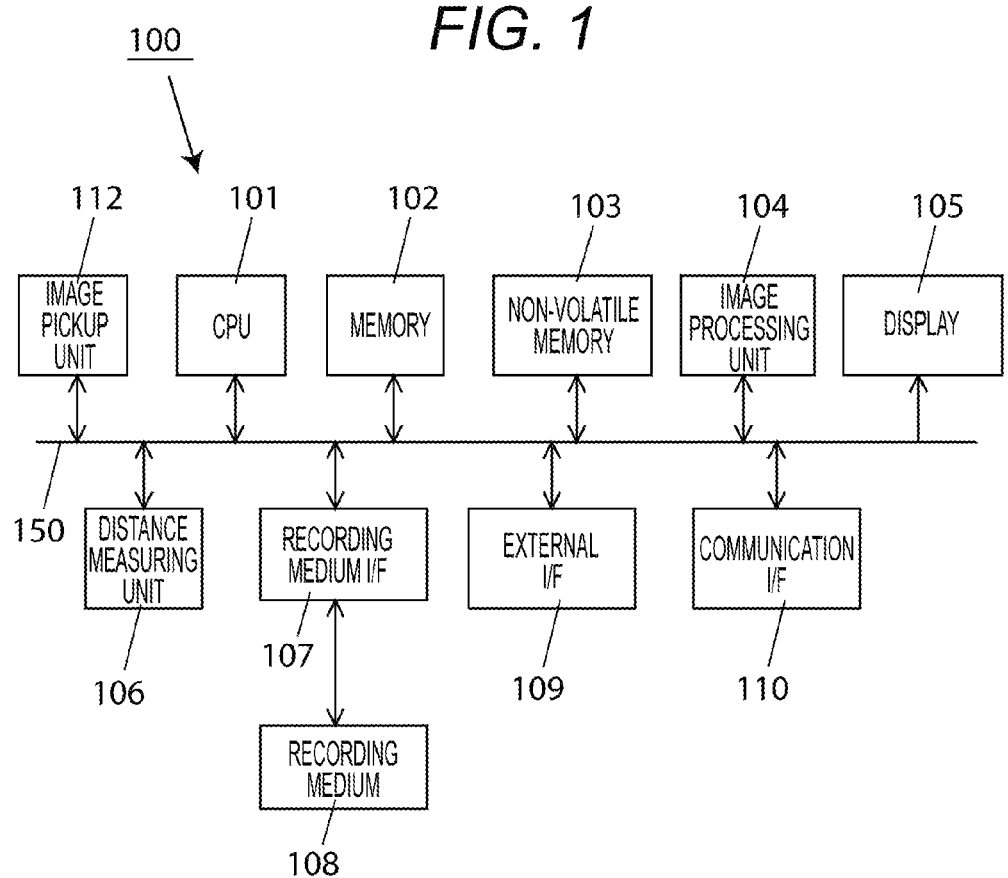
FIG. 1 is a schematic configuration block diagram of an embodiment of the present invention.

FIG. 1 illustrates a schematic configuration block diagram of an embodiment of an information processing apparatus according to the present invention. The present embodiment controls an input of handwritten information (for example, characters and figures) according to a distance condition related to whether a distance to a base point (for example, a tip of a finger) of a gesture operation is equal to or more than a reference distance, or equal to or less than the reference distance.

An information processing apparatus 100 illustrated in FIG. 1 can be realized by a personal computer (hereinafter, abbreviated as PC), for example. A CPU 101, a memory 102, non-volatile memory 103, an image processing unit 104, a display 105, a distance measuring unit 106, a recording medium I/F 107, an external I/F 109, a communication I/F 110, and an image pickup unit 112 are connected to an internal bus 150. The units connected to the internal bus 150 can exchange data through the internal bus 150.

The memory 102 is made of RAM (volatile memory using a semiconductor element or the like). The CPU 101 controls the units of the information processing apparatus 100 using the memory 102 as a work memory according to programs stored in the non-volatile memory 103, for example. In the non-volatile memory 103, image data, audio data, other data, various programs for operating the CPU 101, and the like are stored. The non-volatile memory 103 is configured from a hard disk drive (HDD), flash memory, or the like.

The image processing unit 104 applies various types of image processing to the image data stored in the non-volatile memory 103 or a recording medium 108, a picture signal acquired from the image pickup unit 112 or the external I/F 109, the image data acquired from the communication I/F 110, based on the control of the CPU 101. Examples of the image processing performed by the image processing unit 104 include A/D conversion processing, D/A conversion processing, image data encoding processing, compression processing, decoding processing, enlargement/reduction processing (resizing), noise reduction processing, and color conversion processing. The image processing unit 104 may be configured from a special circuit block for applying specific image processing. The CPU 101 may apply corresponding image processing according to the programs without using the image processing unit 104, depending on a type of the image processing.

The display 105 displays an image, a GUI screen that configures a graphical user interface (GUI), and the like, based on the control of the CPU 101. The CPU 101 generates display control signals according to the programs, and controls the respective units of the information processing apparatus 100 to generate a display image signal for displaying an image on the display 105 and output the display image signal to the display 105. The display 105 displays an image based on the input display image signal. Note that the configuration included in the information processing apparatus 100 itself may be up to the interface for outputting the picture signal to display on the display 105, and the display 105 may be configured from an external monitor (a television receiver, or the like). Alternatively, the information processing apparatus may have a configuration that acquires an external picture signal such as a television reception signal or the like from the external I/F 109, generates the display image signal from the external picture signal or the like, and supplies the display image signal to the display 105.

The distance measuring unit 106 measures a distance between the information processing apparatus 100 and an object. The object is the finger of the user, for example. The object may be a pen for instruction or the like. To measure the distance between the information processing apparatus 100 and the object, a generally well-known method, such as a method using reflection of an ultrasonic wave or a sound wave, or a method using change of an electrostatic capacity, can be used. When the image pickup unit 112 includes a so-called autofocus function, the distance between the information processing apparatus 100 and the object can be measured by a common process to a process of searching for a distance to focus the object. For example, the publication of Japanese Patent Application Laid-Open No. 2009-210694 discloses various distance measurement technologies that are put to practical use, such as a TV-AF method, an external distance measurement AF method, and an internal phase difference AF method.

The image pickup unit 112 picks up an image of an object such as the user, and is configured from photographing lenses including a focus function, a zoom function, and an aperture function, a CCD or CMOS element that converts an optical image into an electrical signal, and the like. The image pickup unit 112 may have a configuration that includes a pan/tilt function, and is able to change an image pickup direction.

To the recording medium I/F 107, the recording medium 108 such as a memory card, a CD, or a DVD is attachable. The recording medium I/F 107 reads out data from the attached recording medium 108 and writes data in the recording medium 108, based on the control of the CPU 101.

The external I/F 109 is an interface connected to an external device by a cable or in a wireless manner, for performing input/output of picture signals and audio signals. The communication I/F 110 is an interface for performing communication with an external device or the Internet 111, and transmitting/receiving various types of data such as files and commands.

A method of using the present embodiment will be described with reference to FIGS. 2A to 2E, before description of functions of the respective units of the present embodiment. FIGS. 2A to 2E illustrate transition examples of states of use of the present embodiment.

Figure 2A:
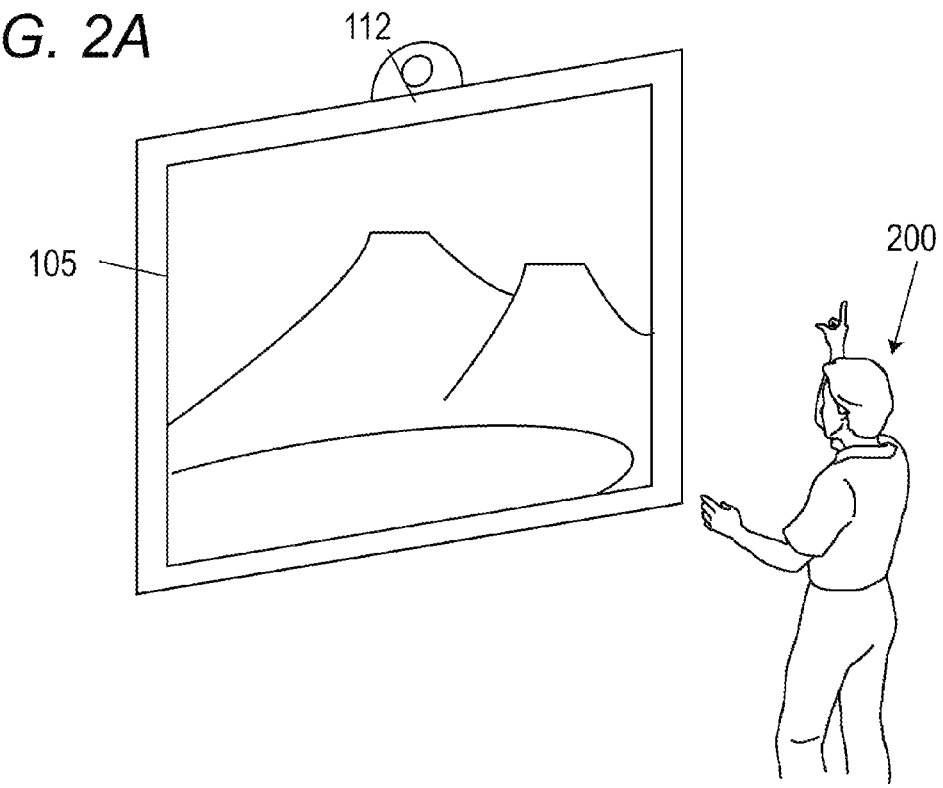
FIG. 2A is an explanatory example illustrating a circumstance immediately before a gesture operation of the present embodiment.
Figure 2B:
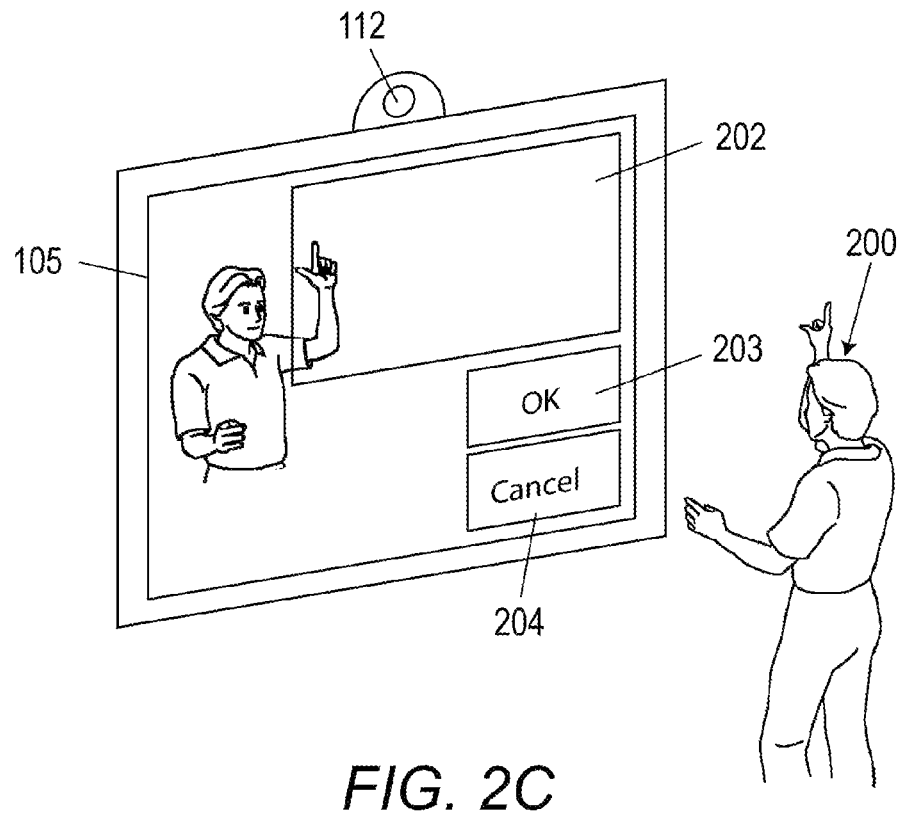
FIG. 2B is an operation explanatory example of setting a reference distance D in the present embodiment.

FIG. 2A illustrates a state in which a user 200 has performed a predetermined operation (for example, an operation to cause the finger to hold a predetermined pose). The image pickup unit 112 picks up an image of the user 200, and a picked-up image by the image pickup unit 112 is displayed on the display 105, as illustrated in FIG. 2B. The picked-up image includes an image of the finger of the user 200. In addition, a character input region 202, a determination button 203, and a cancel button 204 are displayed on the display 105.

Figure 2C:
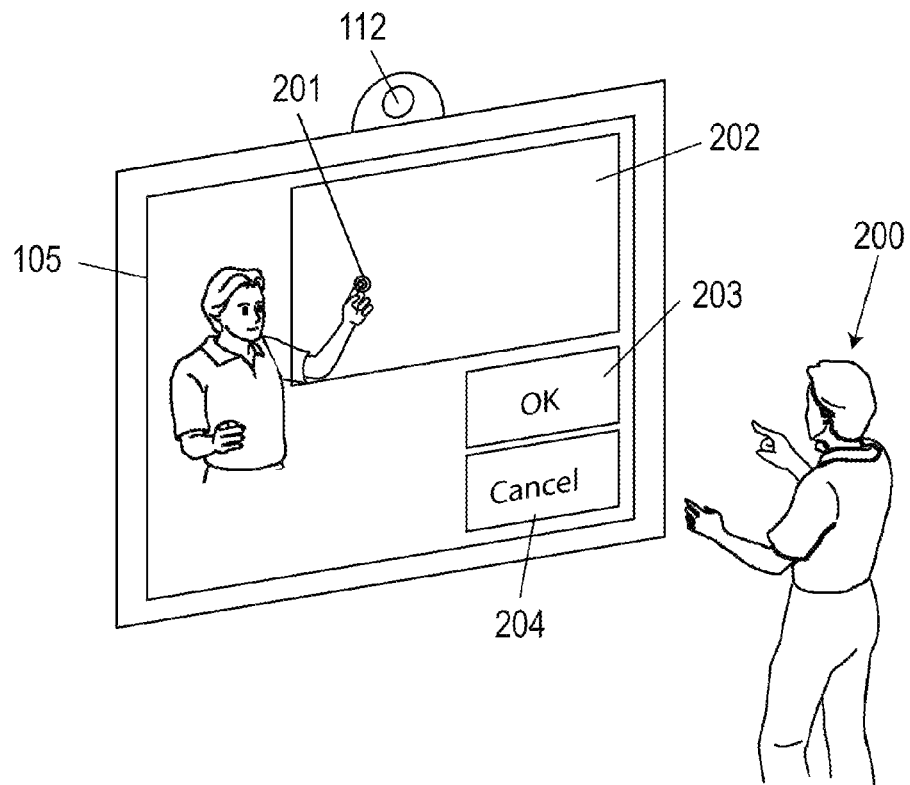
FIG. 2C is an explanatory diagram immediately before an input of a handwritten character in the present embodiment.

When the user puts the finger close to the information processing apparatus 100 to a distance that is smaller than a reference distance D, the CPU 101 displays an identification mark 201 at a position corresponding to a tip of the finger, on a screen of the display 105, as illustrated in FIG. 2C. With the display of the identification mark 201, the user can recognize that the finger comes close to the information processing apparatus to a distance less than the reference distance D.

Figure 2D:
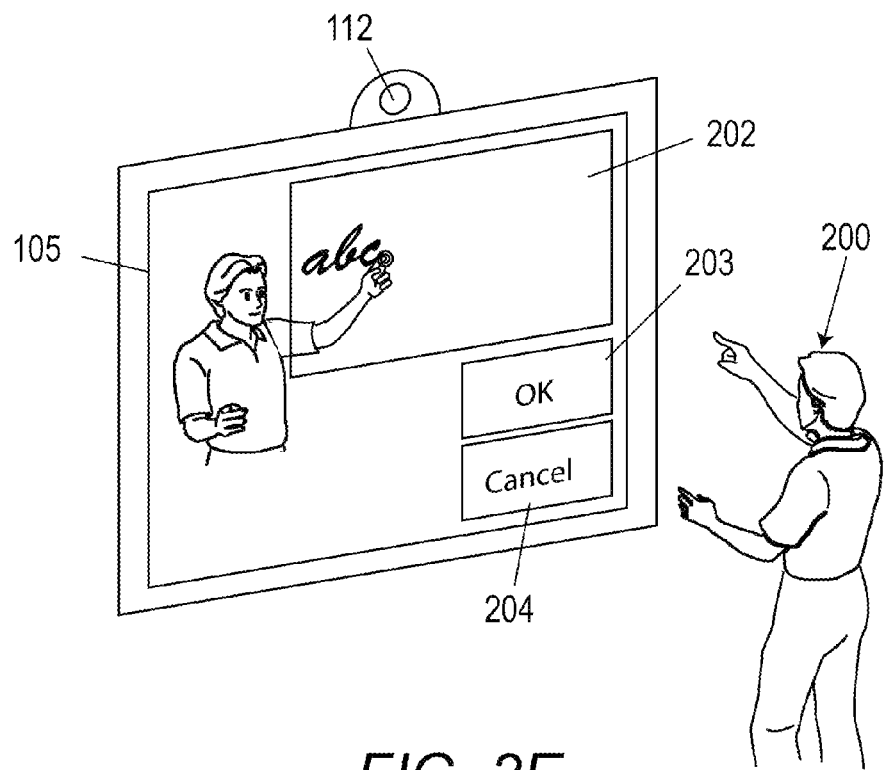
FIG. 2D is an explanatory example during a handwritten character input in the present embodiment.
Figure 2E:
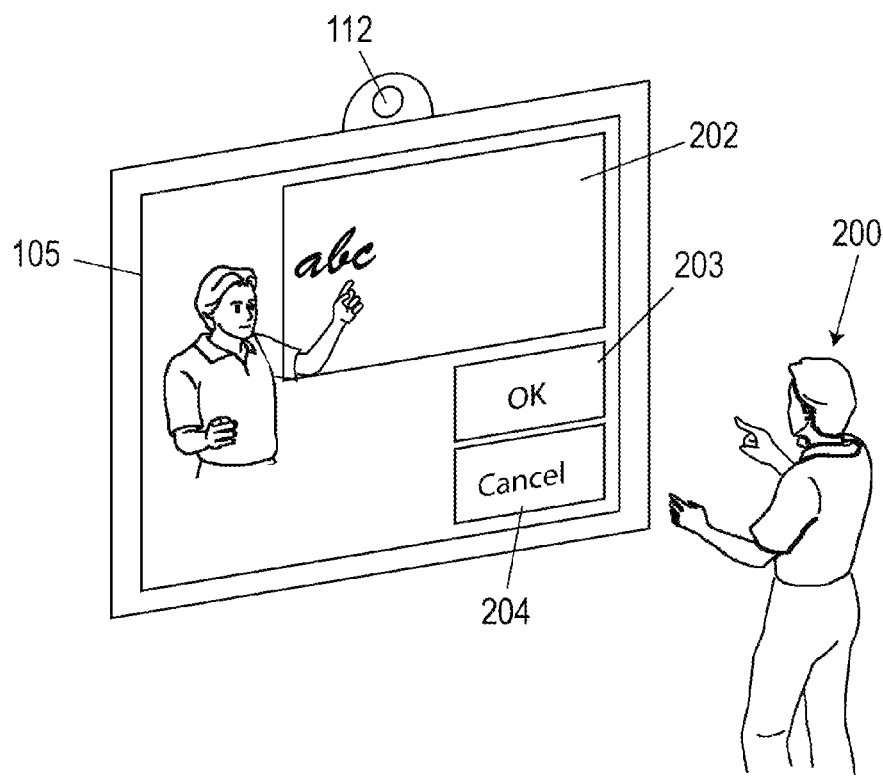
FIG. 2E is an explanatory example of termination of a handwritten character input in the present embodiment.

When the user moves the tip of the finger while keeping the finger close to the information processing apparatus 100 at the distance less than the reference distance D, the CPU 101 displays a movement locus of the tip of the finger on the screen of the display 105, as illustrated in FIG. 2D. When the user wishes to discontinue the display of the locus, the user puts the tip of the finger away from the information processing apparatus 100 to a distance that is larger than the reference distance D. Then, as illustrated in FIG. 2E, the CPU 101 causes the identification mark 201 at the position corresponding to the tip of the finger to disappear on the screen of the display 105. With the disappearance of the identification mark 201, the user can recognize that the tip of the finger is being away from the information processing apparatus 100 by the reference distance or more.

Figure 3A:
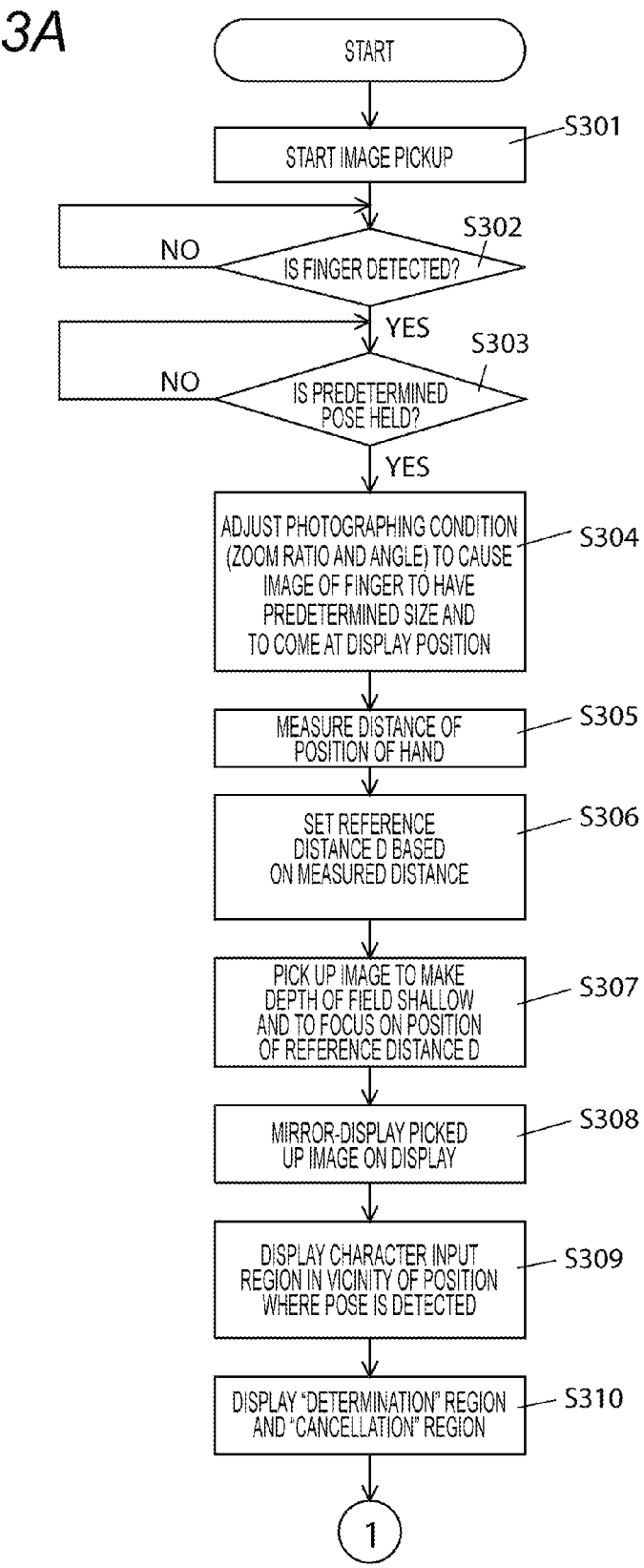
FIG. 3A is an operation flowchart of the present embodiment.
Figure 3B:
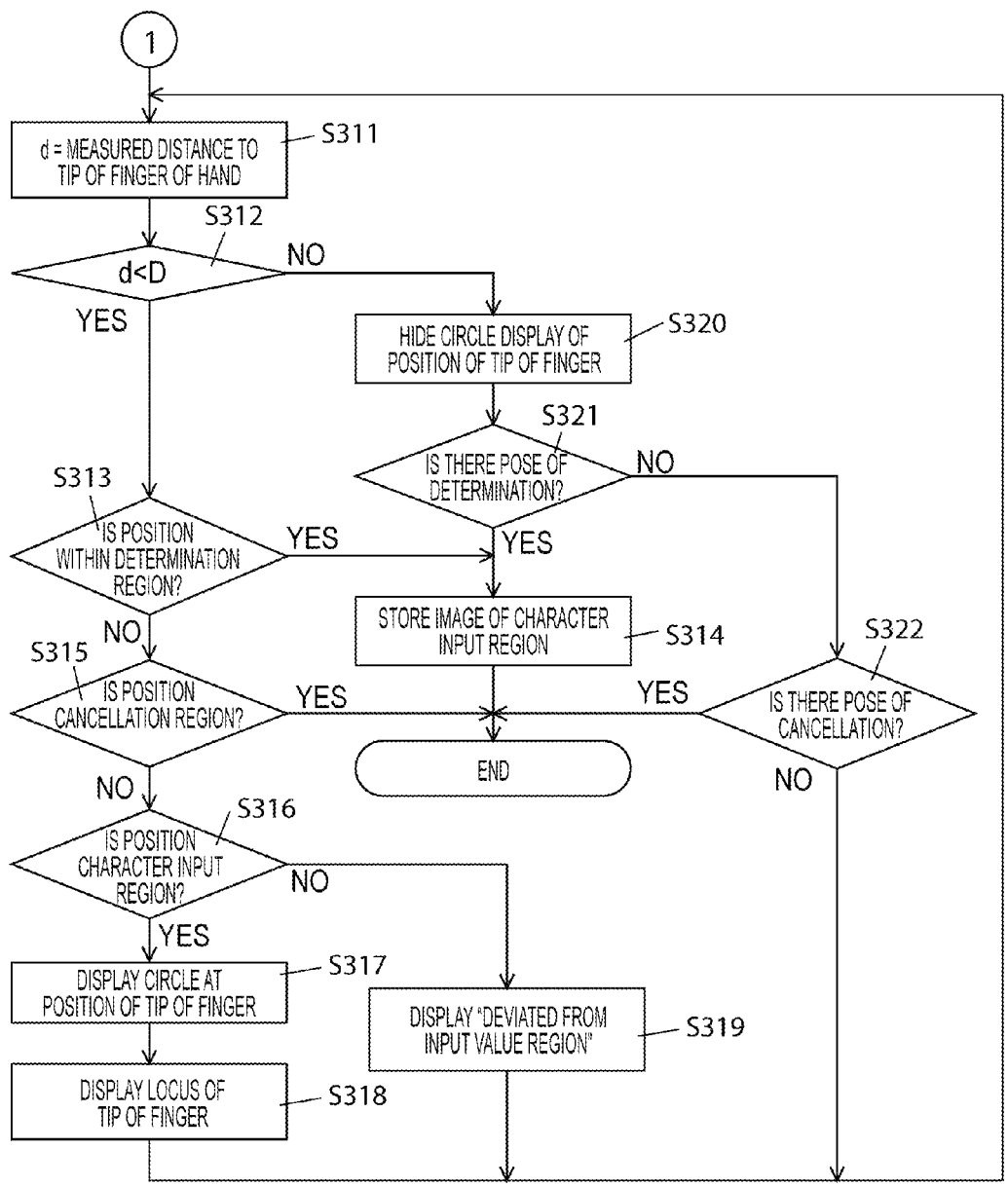
FIG. 3B is an operation flowchart of the present embodiment.

FIGS. 3A and 3B as a whole illustrate a flow chart of a gesture identification processing of the information processing apparatus 100. A program that realizes the processing is recorded in the non-volatile memory 103. The CPU 101 reads the program from the non-volatile memory 103 to the memory 102 and executes the program to realize the processing.

When the information processing apparatus 100 is started with an input of power by the user, at step S301, the CPU 101 starts image pickup in the image pickup unit 112. Then, the CPU 101 analyzes the picked-up image by the image pickup unit 112 and performs detection of the finger. At step S302, the CPU 101 determines whether the finger has been detected from the image picked up in the image pickup unit 112. The detection of the finger can be performed by stochastically and statistically combining an image characteristic included in the picked-up image, and an image characteristic such as an edge component, a pattern of a hue component, existence or non-existence of a nail, a bending direction of a joint learned in advance. Apparently, other method may be employed.

The tip of the finger has been employed as a base point or an object for detecting or identifying a gesture. However, another body part may be employed. Further, a thing other than the finger, such as (a tip of) a stick, a pen or a pencil, or a pointing device, may be employed. Hereinafter, an object to be detected of the gesture, the tip of the finger is used.

At step S303, the CPU 101 determines whether there is a predetermined start operation by the user. For example, the CPU 101 determines whether "the finger has held a predetermined pose". When there is the predetermined operation, the processing proceeds to step S304.

At step S304, the CPU 101 adjusts photographing conditions to cause the finger to have a predetermined size and to come at a predetermined position in the picked-up image. The photographing conditions adjusted here are, for example, a zoom ratio of the image pickup unit 112 and the image pickup direction. Change of the zoom ratio may be optically performed, may be digitally processed (digital zoom), or may be performed by a combination of the above-described processing. Change of the image pickup direction may be performed using the pan/tilt function, may be performed by digital processing to clip a region of the picked-up image, or may be performed by a combination of the above-described processing. With the adjustment, even if the position of the user with respect to the image pickup unit 112 is different to some extent in some cases, the user can easily see a picture of the own finger displayed on the display 105 and can easily operate the apparatus.

At step S305, the CPU 101 measures the distance to the tip of the finger with the distance measuring unit 106.

At step S306, the CPU 101 sets the reference distance D, based on a measured distance value. The reference distance D is a distance shorter than the measured distance to the finger by 0 (zero) to about half of the length of an arm of human. The reference distance D is set at step S306 at the start of the present processing, and is fixed in the processing of at and after step S306. The reason why the reference distance D is set in this way is that the identification mark 201 is displayed when the user puts the finger close to the information processing apparatus 100, and the so-called pen on state (writable state) is activated. For example, when the distance to the finger is 3 m, the reference distance D is set to 2.8 m, which is obtained by subtracting 0.2 m from 3 m.

At step S307, the CPU 101 performs focus adjustment to focus on the position of the reference distance D, and to make depth of field shallow, in regard to image pickup conditions of the image pickup unit 112. The depth of field is a range of the distance of an object side that can be seen being focused, and can be made shallow by opening of a lens aperture to make an F-number small. When the light amount becomes excessive by the opening of the lens aperture, the light amount can be balanced by use of a neutral density (ND) filter, a decrease in sensitivity of the image pickup sensor, or a decrease of an exposure time. By the focus adjustment to focus on the position of the reference distance D and with the shallow depth of field, the finger image on the display 105 becomes more vivid as the user puts the finger closer to the reference distance D, while the finger image becomes more blurred as the finger is away from the information processing apparatus 100. With the degree of sharpness of the finger image, the user can visually recognize how long the finger is moved to become in the so-called pen on state (writable state).

The sharpness of the finger image can be similarly changed by image processing by the image processing unit 104 according to the distance between the finger and the information processing apparatus 100. For example, a distance image (distance map) that indicates a distance difference between the reference distance D and a measured distance d (perspective) of each coordinates in a gray scale is created. Then, a blur effect is applied to the distance image as a so-called alpha channel (an image that defines the amount of application of the effect of each coordinates). With the blur effect, when the finger is put closer to the reference distance D, the image of the finger can get focused.

Further, for a similar purpose, by differentiating the type of the effect of the image processing, the image of the finger can be displayed to gradually appear, by a decrease in transmittance of the image of the finger when the finger is put closer to the reference distance D. Further, the image of the finger can be displayed to change from a black and white image to a colored image, by an increase in color saturation. The image can be displayed to change from a silhouette to a bright image, by an increase in brightness. The above display changes can be combined.

At step S308, the CPU 101 mirror-displays the picked-up image on the display 105 again according to the changed photographing conditions (or image processing conditions). The mirror display is to apply right and left inversion to the picked-up image and display the image. With the mirror display, the direction into which the user has moved the finger or the like and the distance into which the image is moving accord with each other, and the user can sense how the finger image is moved by which direction the finger is moved. Note that the mirror display of the picked-up image may be displayed by being fit in a partial area of display of the external picture signal such as the television reception signal obtained by the external I/F 109, or may be superimposed and displayed by image processing of semitransparency.

At step S309, the CPU 101 displays the character input region 202 on the screen of the display 105, in the vicinity of the position where the pose has been detected. The character input region 202 is displayed on the display 105 as a rectangle of a certain region, as illustrated in FIG. 2B. In displaying the locus of the tip of the finger or the like, by designation of the region 202 as a region for display, the user can identify which range the user needs to perform a gesture operation for an input. With the limitation on the range to identify the gesture operation for an input, efficiency and accuracy of the identification are improved.

At step S310, the CPU 101 displays a determination region 203 and a cancellation region 204 outside the character input region 202, on the screen of the display 105.

At step S311, the CPU 101 measures the distance to the tip of the finger of the user with the distance measuring unit 106. Hereinafter, the measured distance is d. The distance d is measured as needed, and is updated according to the position of the finger of the user of the moment.

At step S312, the CPU 101 compares the distance d measured at step S311 and the reference distance D set at step S306, and determines whether the distance d is shorter than the reference distance D. the CPU 101 proceeds to step S313 when having determined that the tip of the finger of the user comes in a position less than reference distance, that is, d<D, and otherwise proceeds to step S320.

At step S313, the CPU 101 determines whether a position pointed at by the tip of the finger is within the determination region 203. The CPU 101 proceeds to step S314 when having determined that the position is within the determination region 203, and otherwise proceeds to step S315.

At step S314, the CPU 101 stores the image of the locus of the tip of the finger displayed in the character input region 202, by deeming that the user has determined a character input, and an instruction for termination has been made, and terminates the processing illustrated in FIGS. 3A and 3B. Note that, in place of the determination of step S313, determination of whether the distance d becomes larger than the reference distance D may be performed in a state where the position pointed at by the tip of the finger is being within the determination region 203. The CPU 101 may proceed to step S314 when the distance d is larger than the reference distance D, and otherwise proceeds to step S315. That is, determination of whether there is a pen up operation in a state where determination region 203 is being instructed may be employed, in place of determination of whether there is a pen down operation to the determination region 203.

At step S315, the CPU 101 determines whether the position pointed at by the tip of the finger of the user is within the cancellation region 204. When the position of the tip of the finger is within the cancellation region 204, the CPU 101 terminates the processing without storing the image of the locus of the tip of the finger, deeming that the character input has been cancelled and an instruction for termination has been given by the user. When the position of the tip of the finger is not within the cancellation region 204, the CPU 101 proceeds to step S316. The determination of step S315 may be performed according to determination of whether there is a pen up operation in a state where the cancellation region 204 is being instructed, in place of determination of whether there is a pen down operation to the cancellation region 204, similarly to step S313.

At step S316, the CPU 101 determines whether it is the pen on state (d<D) and the position instructed by the tip of the finger of the user is within the character input region 202. The CPU 101 proceeds to step S317 when the position is within the character input region 202, and otherwise proceeds to step S319, that is, when the tip of the finger has moved to an outside of the character input region 202 in the state of d<D.

At step S317, the CPU 101 displays the identification mark 201 such as a "circle" mark at the position of the tip of the finger on the display 105. Accordingly, the user can recognize that it is the so-called pen on state (writable state).

At step S318, the CPU 101 displays the locus of the tip of the finger on the display 105 according to the movement of the tip of the finger in the pen on state. With the display of the locus, the user can continue the input operation while confirming the content of the input so far.

At step S319, the CPU 101 displays a fact of "being deviated from the input region" on the display 105. For example, the CPU 101 may display a message text of such a fact, or may display the character input region or a frame of the region in a color or a shape different from before.

At step S320, the CPU 101 hides the identification mark 201 at the position of the tip of the finger on the display 105.

At step S321, the CPU 101 determines whether there is a predetermined determination operation by the user. The CPU 101 proceeds to step S314 when there is the determination operation, and otherwise proceeds to step S322. The determination operation is an operation to cause the finger to hold a predetermined pose corresponding to the determination. The operation is not limited to the operation to hold a pose and may be an operation to an operation member such as a remote controller (not illustrated). When there is the determination operation, the CPU 101 stores the image of the locus of the tip of the finger displayed in the character input region 202 at step S314, and terminates the processing illustrated in FIGS. 3A and 3B.

At step S322, the CPU 101 determines whether there is a predetermined cancellation operation. The CPU 101 terminates the processing illustrated in FIGS. 3A and 3B when there is the cancellation operation, and otherwise returns to step S311 and repeats the processing. The cancellation operation is an operation to cause the finger to hold a predetermined pose corresponding to the cancellation. The operation is not limited to the operation to hold a pose and may be an operation to the operation member such as a remote controller (not illustrated). When there is the cancellation operation, the CPU 101 terminates the processing illustrated in FIGS. 3A and 3B without storing the image of the locus of the tip of the finger.

The present embodiment has an effect as follows. That is, when the user intends to input the locus by moving the finger or the like in the space, the so-called pen on state (writable state) or the pen off state (non-writable state) becomes clear. That is, it is possible to distinguish the gesture performed by the user with an intension of an input operation, and the motion of the finger or the like without a purpose of the input operation.

By adding of change of one or more of the blurring, transmittance, brightness, and color saturation to the picked-up image or the finger image according to a distance gap between the reference distance D and the distance d to the finger, the user can be given realization of a distance suitable for a handwritten input.

Second Embodiment

An embodiment applied to a system using a head mounted-type display (head mounted display, HMD) will be described. In this embodiment, a distance measuring device that measures a distance to an object is incorporated in the HMD, the distance to a finger of a user on which the HMD is mounted is detected, and display of the HMD is controlled according to a measured distance, similarly to the first embodiment.

Figure 4A:
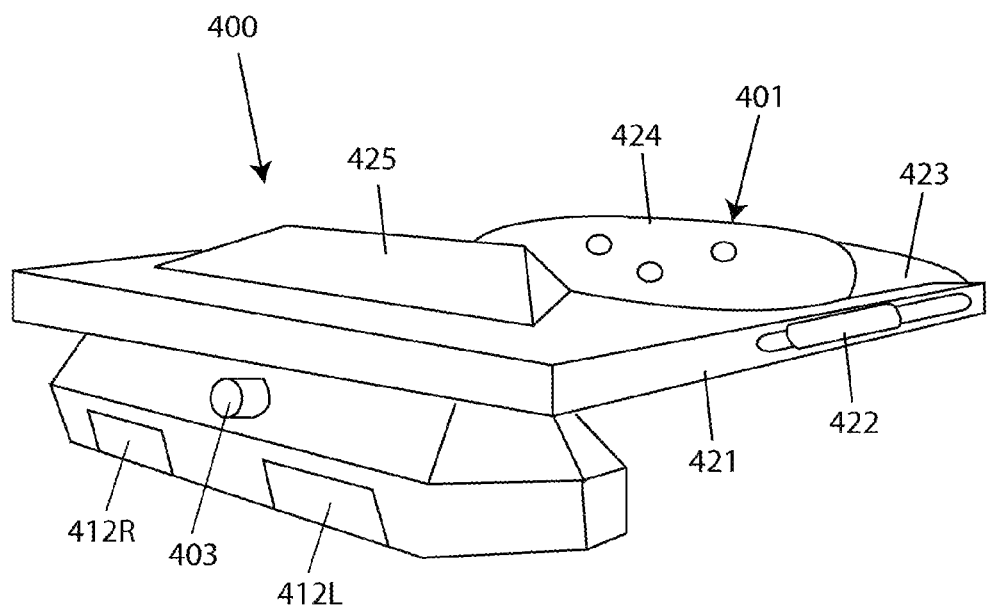
FIG. 4A illustrates an external view as viewed from a front side of a second embodiment of the present invention.
Figure 4B:
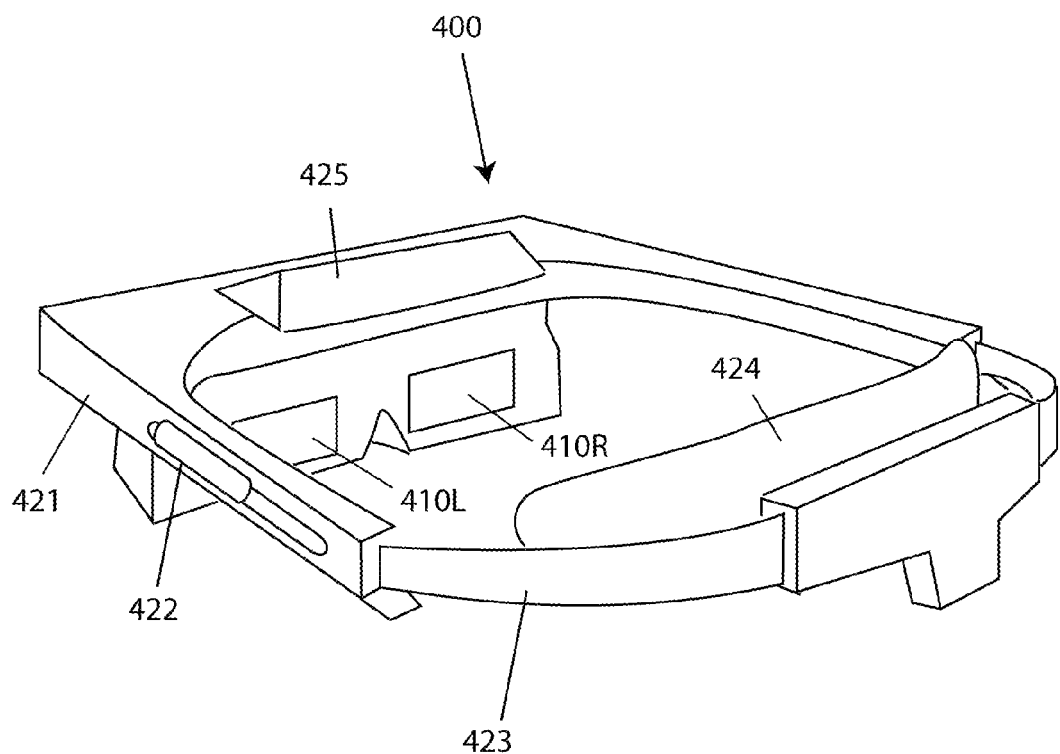
FIG. 4B illustrates an external view as viewed from a back side of the second embodiment.
Figure 4C:
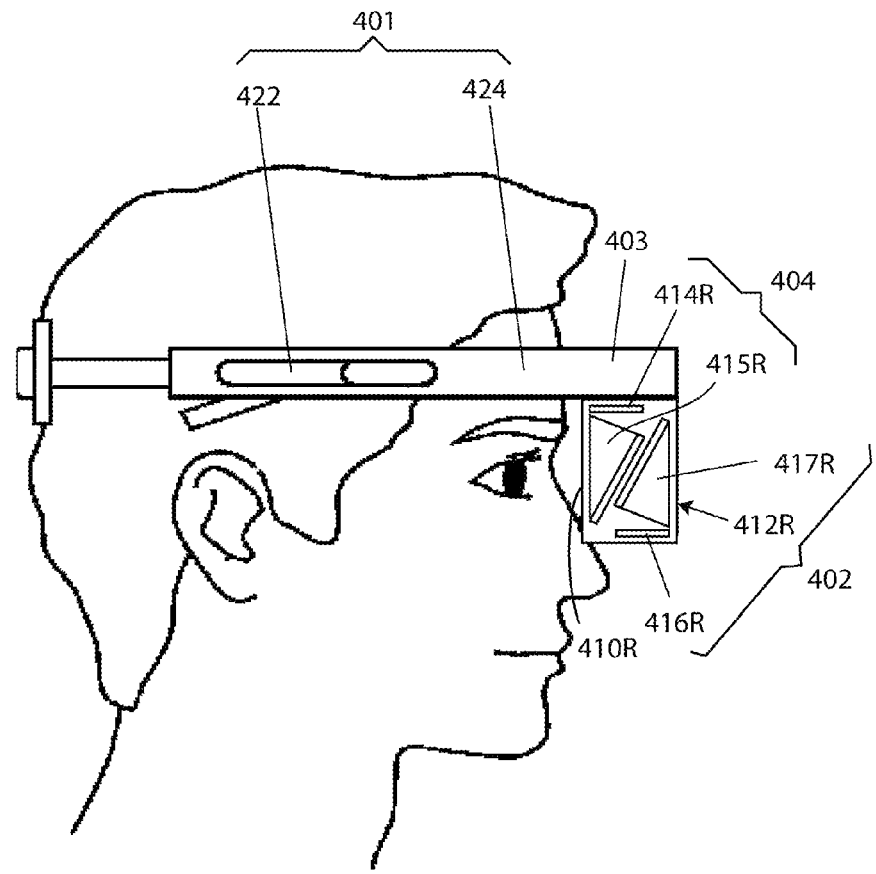
FIG. 4C illustrates a side view of a state in which the second embodiment is mounted on a head of a user.
Figure 4D:
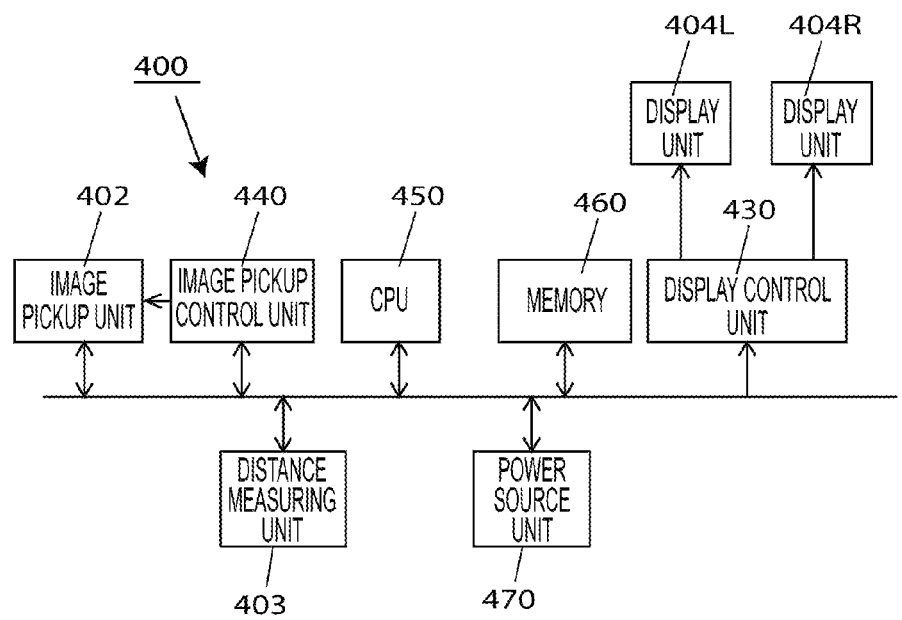
FIG. 4D illustrates a schematic configuration block diagram of the second embodiment.

FIG. 4A illustrates an external view of an HMD-type information processing terminal 400 (hereinafter, abbreviated as "HMD 400") as a second embodiment of the present invention as viewed from a front side. FIG. 4B is a side view of the HMD 400 as viewed from a back side. FIG. 4C is a side view of a state in which the HMD 400 is mounted on a head of the user. FIG. 4D illustrates a schematic configuration block diagram of the HMD 400.

A heat mounting unit 401 is used to mount the HMD 400 on the head of the user, and is made of configuration members 421 to 425. To mount the HMD 400 on the head, first, the HMD 400 is put on the head in a state where a length adjusting unit 423 is loosened by an adjuster 422. Then, after a forehead mounting unit 425 is attached to the forehead firmly, the length adjusting unit 423 is fastened by the adjuster 422 such that a side head mounting unit 421 and a rear head mounting unit 424 are respectively attached to the side head and the rear head firmly. Note that various types of HMD 400 such as a glass frame type or a helmet type are available, other than the goggle type described here.

An image pickup unit 402 is a so-called digital camera, and is arranged in the HMD 400 to pick up an image of an approximately same direction as a direction into which a face of the user who mounts the HMD 400 on the head faces. To be specific, light incident from an outside of the HMD 400 through an incident window 412 is led to an inside of the HMD 400 with an optical prism 417, and is received by an image pickup sensor 416.

A distance measuring unit 403 measures a distance between the HMD 400 and an object ahead. Here, the distance measuring unit 403 measures a distance between the HMD 400 and a tip of the finger of the user. A pen for instruction may be used other than the tip of the finger, which is similar to the first embodiment. As a method to measure the distance between the HMD 400 and the object, a generally well-known method such as a method using reflection of an ultrasonic wave or a sound wave, or a method using change of an electrostatic capacity can be used. Further, when the image pickup unit 402 includes a so-called autofocus function, the distance between the HMD 400 and the object can be measured by a common process to a process of searching for a distance to focus the object. For example, the publication of Japanese Patent Application Laid-Open No. 2009-210694 discloses various distance measurement technologies that are put to practical use, such as a TV-AF method, an external distance measurement AF method, and an internal phase difference AF method.

A display unit 404 (404L and 404R) is made of a screen 410 (410L and 410R), a color liquid crystal display 414 (414L and 414R), and an optical prism 415 (415L and 414R). The L and R added to the reference signs respectively indicate for the left eye and for the right eye. The display unit 404 is arranged at a position corresponding to glass lenses in a pair of glasses to face the positions of eyes of the user. To be specific, an image displayed in the color liquid crystal display 414 is lead to the screen 410 with the optical prism 415, and is displayed on the screen 410.

Output light of the optical prism 415 of the display unit 404 and input light of the optical prism 417 of the image pickup unit 402 accord with an optical axis of a pupil of the user when the HMD 400 is mounted. The image pickup sensor 416 picks up an image of an object in a real space that can be visually identified according to the position and the direction of the user.

The color liquid crystal display 414 displays an image that is obtained by electrically superimposing a so-called computer graphic image of a GUI and the like (compositing an image) on the image of the real space picked up by the image pickup unit 402.

The HMD 400 includes a display control unit 430, an image pickup control unit 440, a CPU 450, a memory 460, and a power source unit 470 inside a main body (including the head mounting unit 401), as illustrated in FIG. 4D.

The display control unit 430 controls display of the display unit 404. To be specific, the display control unit 430 controls the size, position, direction, hue, and transmittance of an image of a virtual object to be superimposed and displayed (composited) on the image of the real space, movement associated with change of the display of the real space, change of brightness, and the like.

The image pickup control unit 440 controls exposure, distance measurement, and the like, based on a calculation result of predetermined calculation processing using the picked-up image. Accordingly, AF (autofocus) processing, AE (auto exposure) processing, auto white balance (AWB) processing, and the like are performed. When the image pickup unit 402 includes a mechanism that inserts/removes an optical filter to/from an optical path, an anti-vibration mechanism, and the like, the image pickup control unit 440 performs insertion/removal of the optical filter and an anti-vibration operation according to an operation status.

The CPU 450 controls the entire HMD 400 and performs various types of calculation processing. The CPU 450 executes a program recorded in the memory 460 to realize control and processing described below.

The memory 460 is made of a work region and a non-volatile region. A program read from the non-volatile region, and a constant and a variable for system control are expanded in the work region. Further, image data of a virtual object to be superimposed and displayed on the real space is held for display in the memory 460. Further, image data picked up by the image pickup unit 402 and subjected to A/D conversion is expanded in the memory 460 for the purpose of image analysis, image processing, and the like.

The power source unit 470 is made of a primary battery such as an alkaline battery or a lithium battery, and a secondary battery such as an NiCd battery, an NiMH battery, or a Li battery, or an AC adapter and the like, and supplies electric power to the entire HMD 400. The power source unit 470 includes a power switch that switches power source ON and power source OFF according to a condition of a user operation or the like.

FIGS. 5A to 5E illustrate schematic diagrams of states of use of the present embodiment. A use method and an operation of the present embodiment will be briefly described with reference to FIGS. 5A to 5E.

Figure 5A:
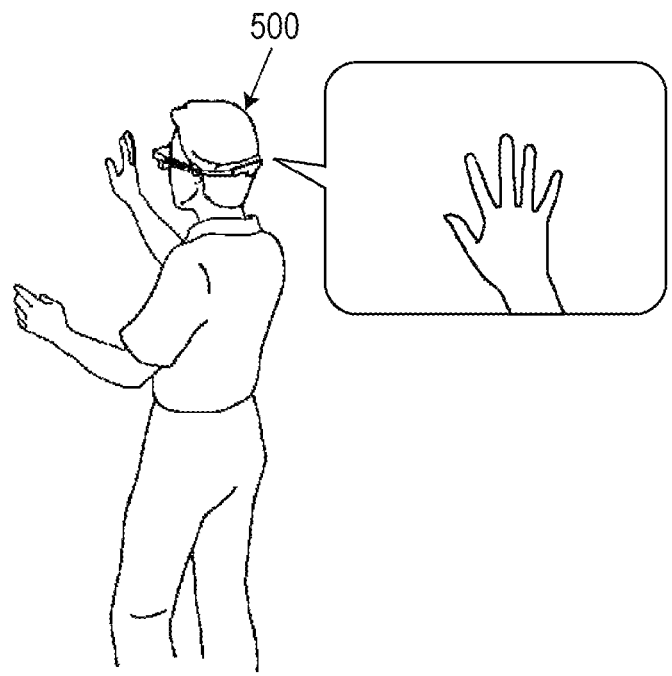
FIG. 5A is an explanatory example illustrating a circumstance immediately before a gesture operation of the second embodiment.
Figure 5B:
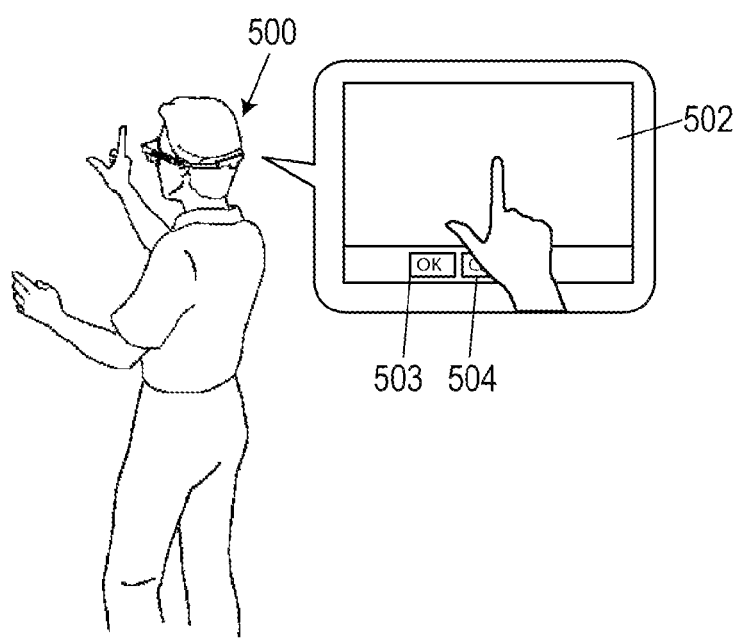
FIG. 5B is an explanatory diagram of a state in which an image of a finger of the user is picked up in the second embodiment.

When a user 500 who mounts the HMD 400 holds the finger in front of the eyes, an image of the finger of the user 500 is displayed on a display unit 404 of the HMD 400 as illustrated in FIG. 5A. Here, as illustrated in FIG. 5B, assume that the user 500 performs a predetermined operation (for example, the user 500 causes the finger to hold a predetermined pose). The CPU 450 displays a so-called graphical user interface (GUI) of a character input region 502, a "determination" region 503, and a "cancellation" region 504, on the display unit 404, superimposing the GUI on the picked-up image by the image pickup unit 402, according to the pose. In a region where the elements of the GUI and the image of the finger of the user 500 by the image pickup unit 402 are superimposed on each other on the display screen, the portion of the GUI is displayed to be cut off or to be transmitted to cause the user to feel as if the GUI exists behind the finger of the user. Such display enables the user to feel as if there is a virtual screen behind the finger of the user 500, and the GUI is displayed on the virtual screen.

Figure 5C:
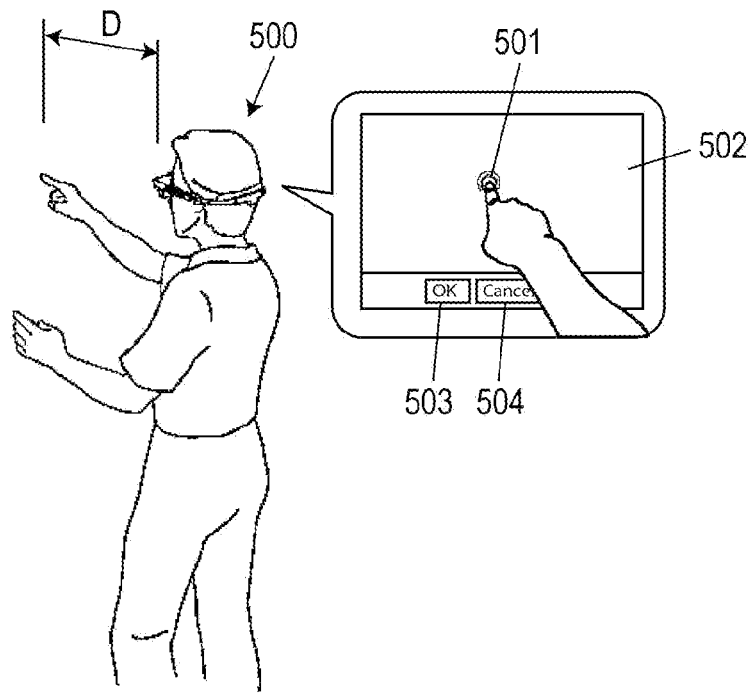
FIG. 5C is an explanatory example immediately before an input of a handwritten character in the second embodiment.

When the user 500 puts the finger away from the HMD 400 by the reference distance D or more, the CPU 450 displays an identification mark 501 at a position corresponding to the tip of the finger on the screen of the display unit 404, as illustrated in FIG. 5C. With the identification mark 501, the user can recognize that the finger is being away from the HMD 400 by the reference distance D or more.

Figure 5D:
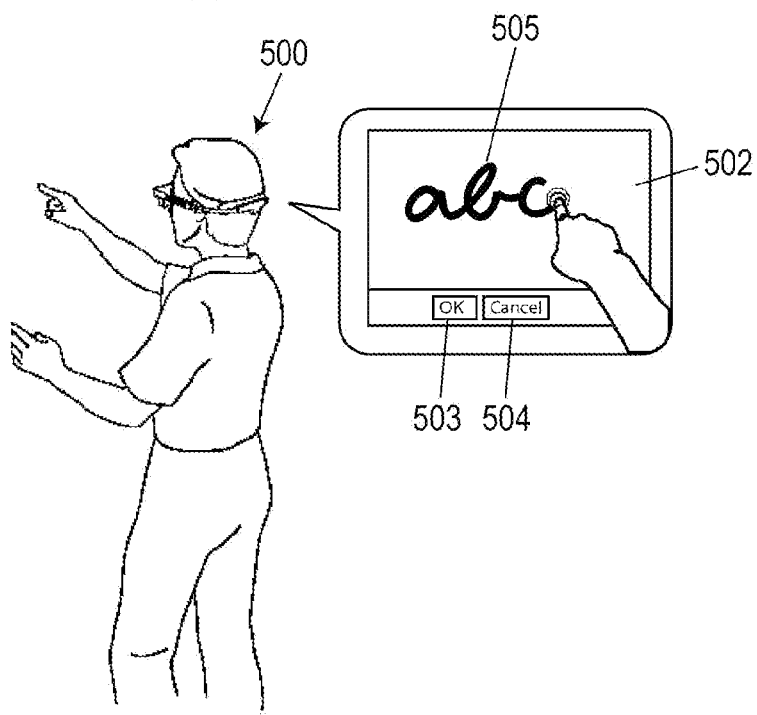
FIG. 5D is an explanatory example during an input of a handwritten character in the second embodiment.
Figure 5E:
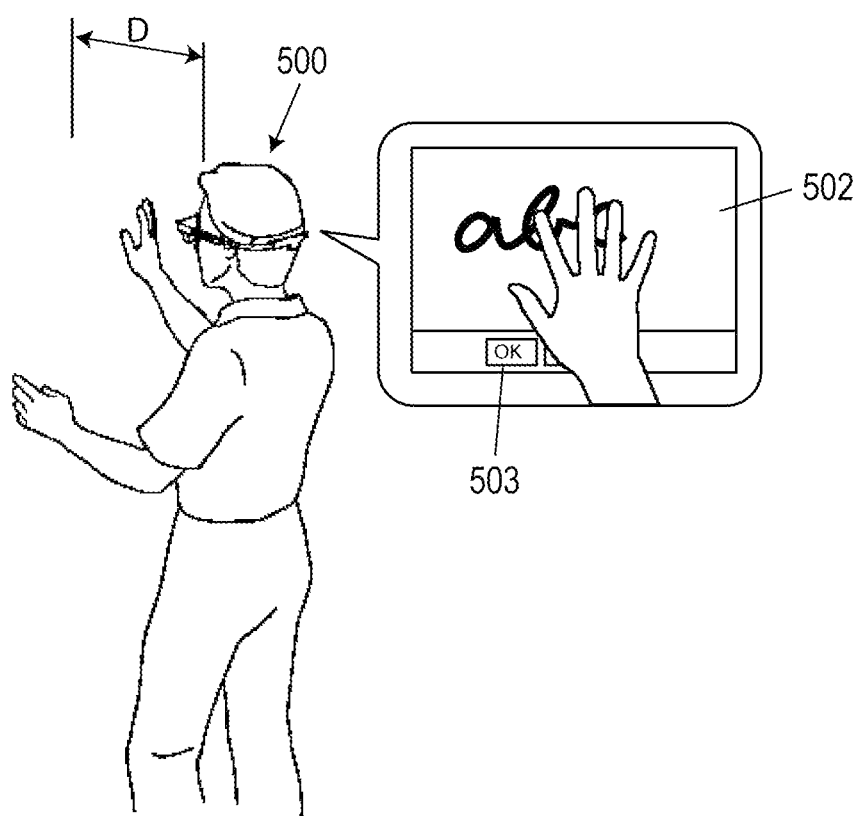
FIG. 5E is an explanatory example of termination of a handwritten character input in the second embodiment.

When the user moves the tip of the finger while keeping the finger away from the HMD 400 with the reference distance D or more, the CPU 450 displays a movement locus 505 of the tip of the finger on the screen of the display unit 404, as illustrated in FIG. 5D. The user puts the tip of the finger close to the HMD 400 to a distance less than the reference distance D when the user wishes to discontinue the display of the locus. Then, the CPU 450 causes the identification mark 501 at the position corresponding to the tip of the finger on the screen of the display unit 404 to disappear. With the disappearance of the identification mark 501, the user can recognize that the tip of the finger is coming close to the HMD 400 to a distance less than the reference distance.

That is, when the user intends to input the locus by moving the finger (or a pen or a pencil, or a pointing device) in the space, the so-called pen on state (writable state) or the pen off state (non-writable state) becomes clear. That is, it is possible to distinguish the gesture performed by the user with an intension of an input operation, and the motion of the finger or the like without a purpose of the input operation.

Further, the user performs an operation to write characters and figures on a virtual screen, and thus an intuitive and easy-to-understand user interface can be realized.

(Others) An example of inputting characters has been described in the above-described embodiments. However, it is apparent that the present invention can be applied to a case of inputting graphics that do not configure the characters.

The control by the CPU 101 may be performed by one piece of hardware, or control of the entire apparatus may be performed such that the processing is shared by a plurality of pieces of hardware.

Favorable embodiments of the present invention have been described. However, the present invention is not limited to the above-described specific embodiments, and various forms without departing from the gist of the invention are also included in the present invention. The above-described embodiments merely describe embodiments of the present invention, and the embodiments can be appropriately combined.

Embodiment in which the present invention is applied to the information processing apparatus that displays handwritten characters and fingers by body expression such as a gesture have been described. However, the present invention can be generally applied to devices that input handwritten characters and figures by a gesture.

According to the present invention, an information processing apparatus that can appropriately distinguish a gesture performed by the user with an intension of an input operation, and a motion of a finger without a purpose of the input operation can be provided.

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-108073, filed May 26, 2014 which is hereby incorporated by reference herein in its entirety.

What is claimed is:

1. An information processing apparatus comprising a memory and at least one processor which function as:
   a detection unit configured to detect a base point of an operation body that performs a gesture operation;

a distance measuring unit configured to measure a distance between the information processing apparatus and the base point;

a processing unit configured to perform processing according to a motion of the base point when the distance to the base point satisfies a distance condition of whether the distance is equal to or less than a reference distance or the distance is equal to or more than the reference distance;

a display control unit configured to display a picked-up image on a display unit, the picked-up image being an image of the operation body picked up by an image pickup unit, and to perform control to display an identification mark at a position on the display unit corresponding to a position of the base point in the picked-up image displayed on the display unit when the distance to the base point satisfies the distance condition; and an image pickup control unit configured to control focus of the image pickup unit to focus the base point in the picked-up image at the reference distance and to control an aperture of the image pickup unit to make depth of field shallow with respect to the base point in the picked-up image.

2. The information processing apparatus according to claim 1, wherein the display control unit performs control to mirror-display the picked-up image.

3. The information processing apparatus according to claim 2, wherein the display control unit performs control to mirror-display the picked-up image according to a fact that the operation body holds a predetermined pose.

4. The information processing apparatus according to claim 1, wherein the image pickup control unit performs control to perform optical zoom or electronic zoom to cause the base point to be displayed at a predetermined size in the picked-up image.

5. The information processing apparatus according to claim 1, wherein the image pickup control unit performs control to perform panning or tilting to cause the base point to be displayed at a predetermined position in the picked-up image, or performs control to perform cut-out processing from the picked-up image.

6. The information processing apparatus according to claim 1, wherein the image pickup control unit starts control based on the base point according to a fact that the operation body holds a predetermined pose.

7. The information processing apparatus according to claim 1, wherein the display control unit performs control to display the pick-up image in hue or brightness according to a gap between the distance to the base point, and the reference distance.

8. The information processing apparatus according to claim 1, wherein the processing unit determines the reference distance, based on the distance to the base point of when the operation body holds a predetermined pose.

9. The information processing apparatus according to claim 1, wherein the processing is handwriting processing to the display unit, the handwriting processing being a rendering process according to a motion of the position of the base point of when the distance to the base point satisfies the distance condition.

10. A method of controlling an information processing apparatus, the method comprising the steps of:

detecting a base point of an operation body that performs a gesture operation;

measuring a distance between the information processing apparatus and the base point;

performing processing according to a motion of the base point when the distance to the base point satisfies a distance condition of whether the distance is equal to or less than a reference distance or the distance is equal to or more than the reference distance;

performing control to display an identification mark at a position on a display unit according to a position of the base point when the distance to the base point satisfies the distance condition; and controlling focus of an image pickup unit to focus the base point in the picked-up image at the reference distance and controlling an aperture of the image pickup unit to make depth of field shallow with respect to the base point in the picked-up image.

11. A non-transitory computer-readable storage medium storing a program for causing a computer to perform the method of claim 10.

* * * * *